US008620266B2

(12) United States Patent
Robertson

(10) Patent No.: US 8,620,266 B2
(45) Date of Patent: Dec. 31, 2013

(54) SECURITY FOR MOBILE COMMUNICATIONS DEVICE

(75) Inventor: Ian M. Robertson, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1021 days.

(21) Appl. No.: 10/895,353

(22) Filed: Jul. 21, 2004

(65) Prior Publication Data

US 2005/0020315 A1    Jan. 27, 2005

(30) Foreign Application Priority Data

Jul. 22, 2003   (GB) .................................. 0317118.8

(51) Int. Cl.
*H04M 1/66* (2006.01)
*H04M 1/68* (2006.01)
*H04M 3/16* (2006.01)

(52) U.S. Cl.
USPC ......................................... 455/410; 455/411

(58) Field of Classification Search
USPC ...................................... 455/410, 411, 550.1
See application file for complete search history.

(56) References Cited

U.S. PATENT DOCUMENTS

| | | | | |
|---|---|---|---|---|
| 5,448,764 A | * | 9/1995 | Sondermann et al. | 455/88 |
| 5,475,755 A | * | 12/1995 | Matsumoto | 713/183 |
| 5,862,472 A | * | 1/1999 | Park | 455/411 |
| 5,875,345 A | * | 2/1999 | Naito et al. | 713/323 |
| 5,878,340 A | * | 3/1999 | Asaoka et al. | 455/432.1 |
| 5,937,346 A | * | 8/1999 | Ono | 455/411 |
| 5,983,093 A | * | 11/1999 | Haimi-Cohen | 455/411 |
| 6,023,506 A | * | 2/2000 | Ote et al. | 713/165 |
| RE36,712 E | * | 5/2000 | Sato et al. | 455/574 |
| 6,128,511 A | * | 10/2000 | Irie | 455/558 |
| 6,145,083 A | * | 11/2000 | Shaffer et al. | 726/7 |
| 6,370,400 B1 | | 4/2002 | Decotignie | |
| 6,370,402 B1 | * | 4/2002 | Hakomori | 455/550.1 |
| 6,426,736 B1 | * | 7/2002 | Ishihara | 345/102 |
| 6,463,276 B1 | | 10/2002 | Jonsson | |
| 6,523,125 B1 | * | 2/2003 | Kohno et al. | 713/323 |
| 6,542,729 B1 | | 4/2003 | Chmaytelli et al. | |
| 6,583,714 B1 | | 6/2003 | Gabou et al. | |

(Continued)

FOREIGN PATENT DOCUMENTS

| | | |
|---|---|---|
| CA | 2475180 | 1/2005 |
| DE | 10100345 A1 | 7/2002 |

(Continued)

OTHER PUBLICATIONS

European Search Report for corresponding GB 0317118.8, Jan. 14, 2004.

(Continued)

*Primary Examiner* — Ajit Patel
(74) *Attorney, Agent, or Firm* — Bereskin & Parr LLP/S.E.N.C.R.L., s.r.l.

(57) ABSTRACT

A mobile communications device for communicating with a wireless network, including an electronic storage having data stored thereon, a processor connected to the storage for accessing the data, a communications sub-system connected to the processor for exchanging signals with the wireless network and with the processor, a user input interface connected to send user input signals to the processor in response to user action, and a security module associated with the processor for detecting a trigger condition and automatically taking a security action if a bypass user action is not detected after detection of the trigger condition.

17 Claims, 2 Drawing Sheets

(56) References Cited

U.S. PATENT DOCUMENTS

| | | | |
|---|---|---|---|
| 6,766,161 B2 * | 7/2004 | Geiselman et al. | 455/411 |
| 6,813,498 B1 * | 11/2004 | Durga et al. | 455/456.1 |
| 6,901,511 B1 * | 5/2005 | Otsuka | 713/164 |
| 6,986,050 B2 * | 1/2006 | Hypponen | 713/183 |
| 2001/0016484 A1 | 8/2001 | Decotignie | |
| 2002/0049881 A1 * | 4/2002 | Sugimura | 711/1 |
| 2002/0127996 A1 * | 9/2002 | Chiu | 455/410 |
| 2003/0073448 A1 | 4/2003 | Ozeki et al. | |
| 2003/0074566 A1 * | 4/2003 | Hypponen | 713/183 |
| 2003/0092426 A1 * | 5/2003 | Macor | 455/412 |
| 2003/0097596 A1 * | 5/2003 | Muratov et al. | 713/202 |
| 2004/0203604 A1 * | 10/2004 | Pugliese | 455/411 |
| 2005/0108520 A1 * | 5/2005 | Yamamoto et al. | 713/155 |
| 2005/0191992 A1 * | 9/2005 | Inoue et al. | 455/411 |

FOREIGN PATENT DOCUMENTS

| | | |
|---|---|---|
| EP | 1501330 | 4/2009 |
| EP | 2071884 | 10/2011 |
| JP | 2003-087368 | 9/2001 |
| WO | WO02/054806 A1 | 7/2002 |

OTHER PUBLICATIONS

European Search Report for EP Patent Application No. 04254441.
Examination Report EP 09156911.1-2412, dated Aug. 26, 2010.
Exam Report. European Patent Application No. 04254441.1. Dated: Dec. 13, 2006.
Response. European Patent Application No. 04254441.1. Dated: Jun. 21, 2007.
Exam Report. European Patent Application No. 04254441.1. Dated: Nov. 6, 2007.
Response. European Patent Application No. 04254441.1. Dated: May 14, 2008.
Communication under Rule 71(3) EPC. European Patent Application No. 04254441.1. Dated: Oct. 20, 2008.
Decision to grant a European patent pursuant to Article 97(1) EPC. European Patent Application No. 04254441.1. Dated: Mar. 5, 2009.
Search Report. European Patent Application No. 09156911.1. Dated: May 13, 2009.
Response. European Patent Application No. 09156911.1. Dated: Oct. 14, 2009.
Response. European Patent Application No. 09156911.1. Dated: Mar. 7, 2011.
Communication under Rule 71(3) EPC. European Patent Application No. 09156911.1. Dated: May 19, 2011.
Decision to grant a European patent pursuant to Article 97(1) EPC. European Patent Application No. 09156911.1. Dated: Sep. 29, 2011.
Office Action. Canadian Patent Application No. 2,475,180. Dated: Nov. 21, 2012.
Notification of Completion of Formalities for Registration and Notification of Grant of Rights for Invention Patent. Chinese Patent Application No. 200410068414.4. Dated: Aug. 11, 2006.
Office Action. Chinese Patent Application No. 200410068414.4. Dated: Feb. 10, 2006.
Patent Certificate. Indian Patent Application No. 1345/DEL/2004. Dated: Dec. 13, 2010.

* cited by examiner

SECURITY FOR MOBILE COMMUNICATIONS DEVICE

RELATED APPLICATIONS

This application claims Convention Priority to British patent application No. GB 0317118.8, filed Jul. 22, 2003.

FIELD OF INVENTION

The present invention relates to security for mobile communications devices.

BACKGROUND OF THE INVENTION

As a result of their mobility, mobile communications devices are sometimes lost or stolen. Frequently, the loss of the information stored on a missing device is of greater concern than the loss of the device itself. For example, the device may have sensitive and/or confidential information stored on it that could cause harm if acquired by others. Such sensitive information could include, among other things, stored messages of a confidential nature, and stored communications information that would allow a third party to masquerade electronically as the person to whom the mobile device rightfully belongs.

In some mobile communications networks, once a user discovers that his or her mobile device is missing, he or she can contact the network operator and request that a "kill packet" be sent to the missing mobile device instructing the device to wipe sensitive information from its memory. However, such a system requires that the user realize that the mobile device is missing, and that the mobile device be in communication with the network. If the user relies on the device for communication, they may be unable to report it missing or stolen in a timely manner.

Thus, security for mobile communications devices is a concern.

SUMMARY OF THE INVENTION

According to an example embodiment of the invention, there is provided a mobile communications device for communicating with a wireless network. The mobile communications device includes an electronic storage having data stored thereon, a processor connected to the storage for accessing the data, a communications sub-system connected to the processor for exchanging signals with the wireless network and with the processor, a user input interface connected to send user input signals to the processor in response to user action, and a security module associated with the processor for detecting a trigger condition and automatically taking a security action if a user bypass action is not detected after detection of the trigger condition.

According to another example embodiment of the invention, there is provided a method for providing security for a mobile communication device that is configured to communicate over a wireless communications network, including steps of: (a) monitoring for a trigger condition; (b) subsequent to occurrence of the trigger condition, monitoring for a user bypass action at the mobile communication device; and (b) upon failure to detect the user bypass action after occurrence of the predetermined condition, automatically taking action to protect data stored on the mobile communication device.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

Embodiments of the present invention will now be described, by way of example only, with reference to the attached Figures, wherein.

Like reference numerals are used throughout the Figures to denote similar elements and features.

DETAILED DESCRIPTION

Figure 1:
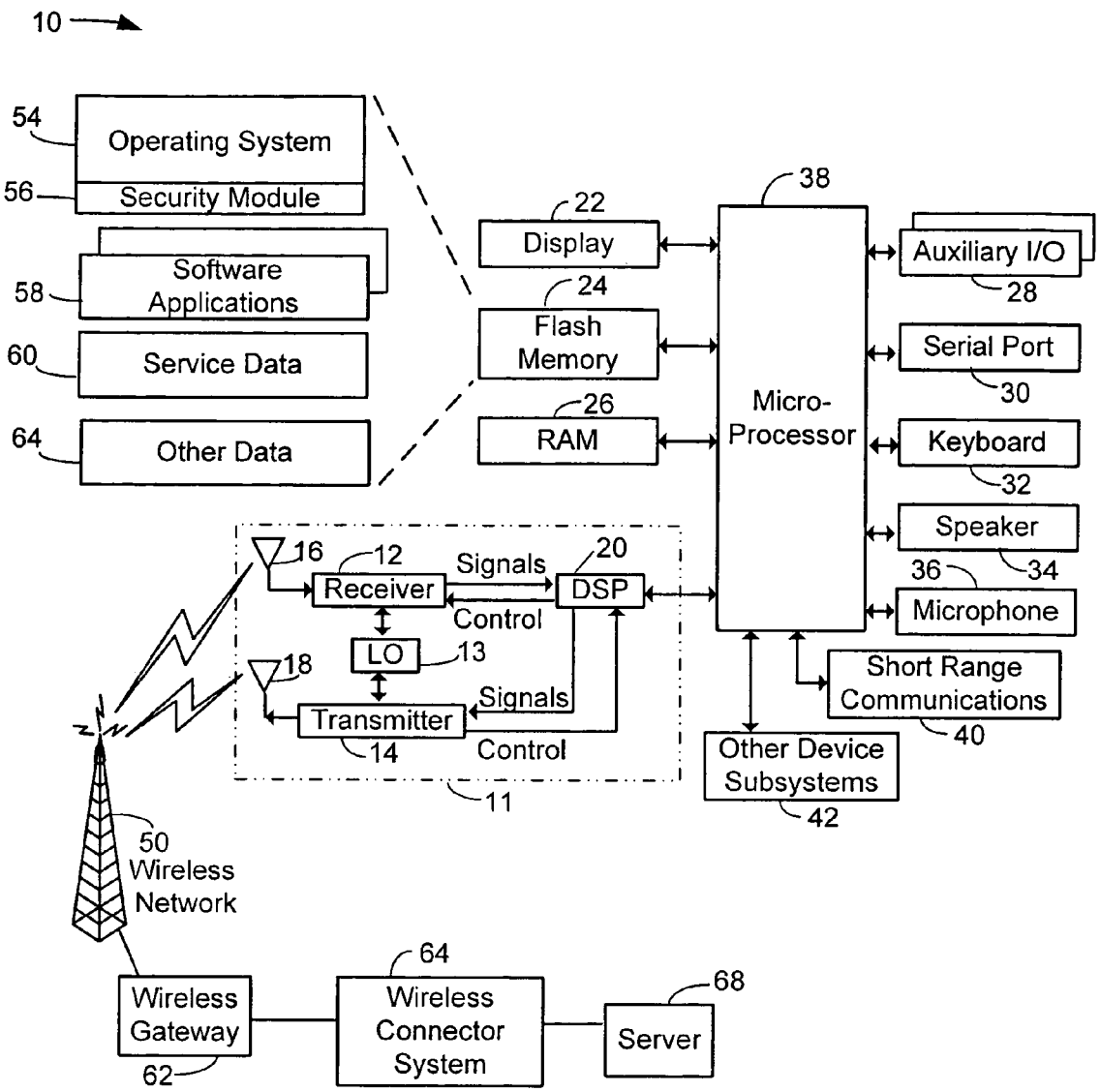
FIG. 1 is a block diagram showing a communications system including a mobile communications device to which the present invention may be applied.

Referring now to the drawings, FIG. 1 is a block diagram of a mobile communication device 10 to which the present invention is applied in an example embodiment. The mobile communication device 10 is a two-way communication device having at least data and preferably also voice communication capabilities. The device preferably has the capability to communicate with other computer systems on the Internet. Depending on the functionality provided by the device, in various embodiments the device may be a data communication device, a multiple-mode communication device configured for both data and voice communication, a mobile telephone, a PDA (personal digital assistant) enabled for wireless communication, or a computer system with a wireless modem, among other things.

The device includes a communication subsystem 11, including a receiver 12, a transmitter 14, and associated components such as one or more, preferably embedded or internal, antenna elements 16 and 18, local oscillators (LOs) 13, and a processing module such as a digital signal processor (DSP) 20. As will be apparent to those skilled in the field of communications, the particular design of the communication subsystem 11 will be dependent upon the communication network in which the device is intended to operate.

Signals received by the antenna 16 through a wireless communication network 50 are input to the receiver 12, which may perform such common receiver functions as signal amplification, frequency down conversion, filtering, channel selection and the like, and in some embodiments, analog to digital conversion. In a similar manner, signals to be transmitted are processed, including modulation and encoding for example, by the DSP 20 and input to the transmitter 14 for digital to analog conversion, frequency up conversion, filtering, amplification and transmission over the communications network 50 via the antenna 18. In certain device embodiments, the antenna 16 and the antenna 18 may be the same antenna while other embodiments will include two separate antenna systems for a receiver antenna and a transmitter antenna.

The device 10 includes a microprocessor 38 that controls the overall operation of the device. The microprocessor 38 interacts with communications subsystem 11 and also interacts with further device subsystems such as the display 22, flash memory 24, random access memory (RAM) 26, auxiliary input/output (I/O) subsystems 28, serial port 30, keyboard or keypad 32, speaker 34, microphone 36, a short-range communications subsystem 40, and any other device subsystems generally designated as 42.

Some of the subsystems shown in FIG. 1 perform communication-related functions, whereas other subsystems may provide "resident" or on-device functions. Notably, some subsystems, such as keyboard 32 and display 22 for example, may be used for both communication-related functions, such as entering a text message for transmission over a communication network, and device-resident functions such as a calculator or task list.

Operating system software 54 and various software applications 58 used by the microprocessor 38 are, in one example embodiment, stored in a persistent store such as flash memory 24 or similar storage element. Those skilled in the art will appreciate that the operating system 54, specific device applications 58, or parts thereof, may be temporarily loaded into a volatile store such as RAM 26. It is contemplated that received communication signals may also be stored to RAM 26.

The microprocessor 38, in addition to its operating system functions, preferably enables execution of software applications 58 on the device. A predetermined set of applications 58 which control basic device operations, including at least data and voice communication applications for example, will normally be installed on the device 10 during manufacture. Further applications may also be loaded onto the device 10 through the network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which will preferably further process the received signal for output to the display 22, or alternatively to an auxiliary I/O device 28. A user of device 10 may also compose data items such as email messages for example, using the keyboard 32 in conjunction with the display 22 and possibly an auxiliary I/O device 28. Such composed items may then be transmitted over a communication network through the communication subsystem 11.

The serial port 30 in FIG. 1 would normally be implemented in a personal digital assistant (PDA)-type communication device for which synchronization with a user's desktop computer (not shown) may be desirable, but is an optional device component. Such a port 30 would enable a user to set preferences through an external device or software application and would extend the capabilities of the device by providing for information or software downloads to the device 10 other than through a wireless communication network.

A short-range communications subsystem 40 is a further component which may provide for communication between the device 10 and different systems or devices, which need not necessarily be similar devices. For example, the subsystem 40 may include an infrared device and associated circuits and components or a Bluetooth™ communication module to provide for communication with similarly enabled systems and devices. The device 10 may be a handheld device.

In an example embodiment, wireless gateway 62 is adapted to route data packets received from a mobile communication device 10 over wireless mobile network 50 to a destination electronic mail messaging or Internet access server 68 through a wireless connector system 64, and to route data packets received from the server 68 through the wireless connector system 64 over the wireless mobile network 50 to a destination mobile communications device. Wireless mobile network 50 is, in an example embodiment, a wireless packet data network, (e.g. Mobitex™ or DataTAC™), which provides radio coverage to mobile devices 10, although it could be any other types of wireless networks. Depending on the type of wireless network 50, it may be necessary to route data packets between a TCP wireless gateway 62 connection and an X.25 or IP address mobile network connection and vice versa using an intermediary routing mechanism that provides TCP clients access to an X.25 connection. As is conventionally known, such a wireless mechanism could use, among other things, NET ID (DataTAC) or FST MAN (Mobitex) to connect to wireless mobile network 50.

Wireless gateway 62 forms a connection or bridge between the servers and wireless networks associated with wireless e-mail communication and/or Internet access. Specifically, wireless gateway 62 is coupled between wireless network 50 and the hardwired data network that includes wireless connector system 64 and destination electronic mail server 68. In an example embodiment, the wireless gateway 62 stores system configuration information, system state data, and tables that store mobile device 10 information, and also includes wireless transport modules that interface between mobile devices 10 and wireless gateway 62. The wireless transport module communicates with wireless mobile network 50 using the intermediary routing mechanism discussed above (that provides TCP clients access to an X.25 or UDP connection) and assembles data packets being received from mobile device 10 over wireless mobile network 50. Once data packets are assembled, they are sent to the upper layer of the wireless transport module for processing through wireless gateway 62 to wireless connection system 64 and eventually to destination electronic mail server 68. Wireless connector system 64 is part of the wired, backbone network and is coupled to wireless gateway 62. Wireless connector system 64 communicates with wireless gateway 62 and each electronic message server that connects to wireless gateway as a unique address. Mail server 68 is coupled to wireless connector system 64 and, in one embodiment, is a conventional electronic mail server.

The mobile device 10 stores service data 60 and other data 64 in an erasable persistent memory, which in one example embodiment is flash memory 24. In various embodiments, the service data 60 includes the information required by the mobile device to establish and maintain communications with the wireless communications network 50 (wireless network service data) and the wireless gateway 62 (gateway service data). Other data 64 may include, among other things, user application data such as email messages, address book and contact information, calendar and schedule information, notepad documents, image files, and other commonly stored user information stored on the device 10 by its user. Other data 64 may also include data required for the communications layers managed by the wireless connector system 64 and servers 68.

Figure 2:
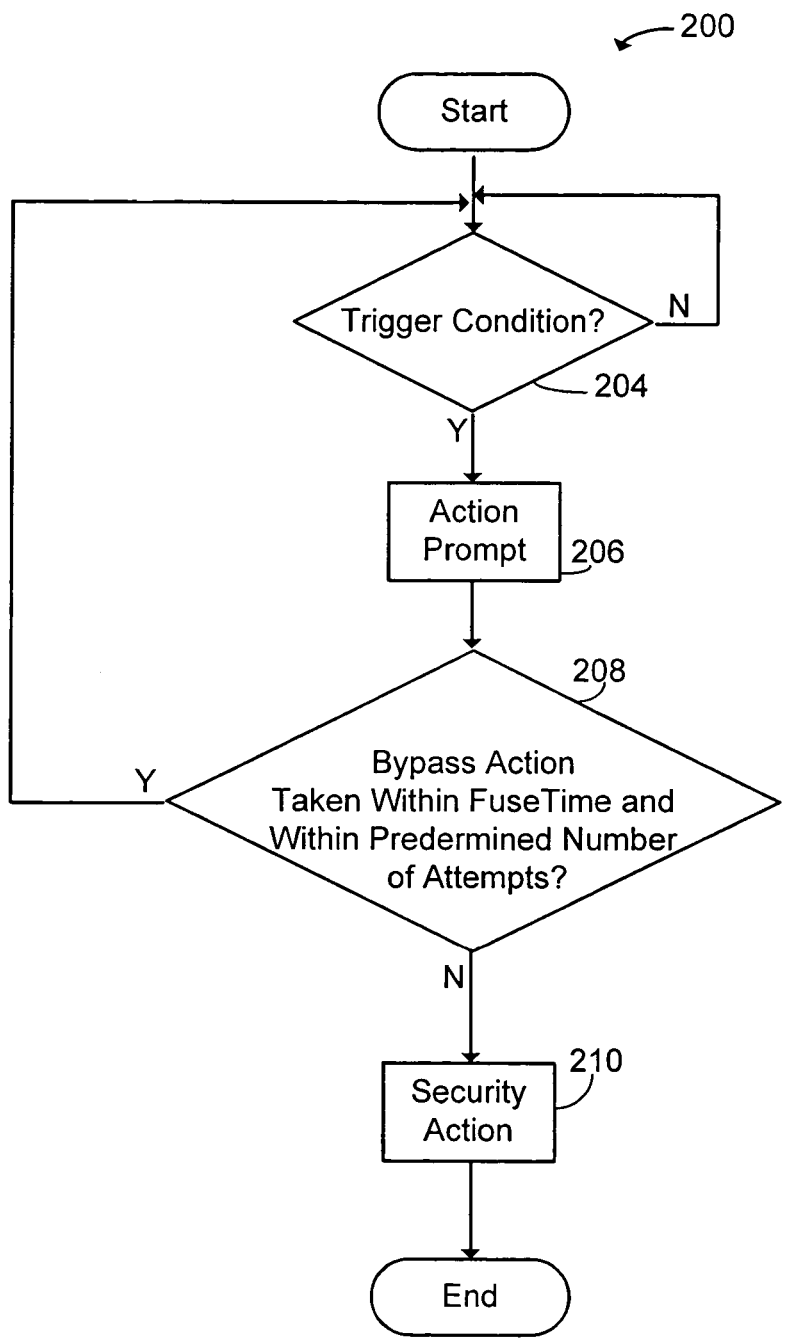
FIG. 2 is a flow diagram of a security process according to embodiments of the invention.

In order to provide security for a lost or stolen mobile device 10, the device 10 includes a security module 56, which in one example embodiment is a software component that is part of the operating system 54. In other embodiments, the security module 56 is, or is part of, a specialized software application 58 separate from the operating system 54. The security module 56 includes instructions for configuring the microprocessor 38 to cause the device 10 to carry out security process 200 that is shown in FIG. 2. The security process 200 is in effect a "deadman's" switch in that it configures the device to, upon the occurrence of one or more predetermined trigger conditions, require a user to take a predetermined user bypass or override action, failing which the mobile device 10 will automatically take active security measures.

In an example embodiment, the security process 200 is active whenever the mobile device 10 is on. As indicated in step 204, the process 200 includes a step 204 of checking to see if one or more predetermined trigger conditions have occurred. Such checking step is periodically carried out until a triggering event occurs. In one example embodiment, a trigger event occurs when the mobile device 10 has been out of communication with wireless network 50 for a predetermined time duration. As indicated in step 206, upon occurrence of a trigger event, the device 10 prompts the user to take bypass action (step 206)—for example, in one example embodiment, the device 10 prompts the user to enter a password or other shared secret through keyboard 32 or, in a device 10 having voice recognition abilities, through microphone 36. In various embodiments, the device 10 prompts the user to take other actions or combinations of actions in addition to or in place of inputting a password or other shared secret, such as, by way of non limiting examples, prompting a user to swipe a card carrying identifying information through a card reader attached to the device 10; and/or prompting the user to move the device so that it re-establishes communications with wireless network 50. In some embodiments, the device 10 skips step 206 and does not actively prompt the user to take a required action, but rather just expects the required action to be taken after the trigger event has occurred.

As indicated in step 208, subsequent to occurrence of a trigger event and after prompting the user to act (in embodiments where a prompt is issued), the device 10 then determines if the required action is taken. In various example embodiments, the required bypass action must be successfully completed within a predetermined time duration (eg. within a "fuse" time) subsequent to the occurrence of the trigger event, and/or within a predetermined number of attempts at the action (for example, within three attempts to enter a password), otherwise the device 10 will proceed to take precautionary security measures. In one embodiment, the security module 56 causes the device 10 to temporarily suspend all or selected communications functions and become effectively non-operational during the fuse time, refusing all attempted user actions other than the bypass action. Thus, during the fuse time the user has no option other than to take the required bypass action, and cannot access data stored on the device or make telephone calls (in phone enabled devices) or send e-mails (in e-mail enabled devices), for example. In some telephone enabled embodiments, 911 calls may be permitted during the fuse time. In alternative embodiments, normal functionality may be fully maintained during the fuse time. If the required bypass action is successfully taken within the fuse time, device functionality is restored, and the security process returns to monitoring for the next trigger event (step 204).

Turning now to step 210, in the event that the required bypass action is not successfully taken by the user in step 208 within the predetermined fuse time or attempt limit, the device 10 automatically undertakes information protection measures. In one embodiment, the device 10, in order to protect the data stored on device 10 from falling into the wrong hands or being used without authorization, the security module 56 erases or wipes all or selected parts of the service data 60 that is stored in the device's 10 persistent and volatile storage. In one example embodiment, service data 60 required to establish and maintain communication between the device 10 and wireless network 50 is permanently erased, effectively disabling the communications ability of the mobile device 10. In some embodiments where the device includes a wireless phone, 911 emergency service may be exclusively maintained. The service data required to establish and maintain communications through the wireless gateway 62 is, in various embodiments, also or alternatively deleted. In various embodiments, in addition to or instead of service data 60, selected portions of all of the other data 64 on the mobile device 10, including the user data such as e-mail messages, contact and address book lists, calendar and scheduling information, notepad documents, image and text files and/or other user information is permanently erased from the storage of mobile device 10. Thus, in step 210, in various embodiments, information required by the device 10 to function as a communications device is deleted, and any text or other information that may be confidential to the user is deleted, thereby removing, among other things, information from the device 10 that could be used by others to electronically impersonate the authorised user of the device 10. In various embodiments, the data protection security action taken in step 210 includes encrypting all or selected portions of the service data and/or other data, rendering such data temporarily unusable, instead of deleting it. In such embodiments, the device 10 has a locally installed encryption engine, and an encryption key stored in the persistent memory of the device is used for the encryption. During or after the encryption process, the encryption key is either deleted or encrypted to protect it. Once encrypted, a decryption key must be obtained from a secure third party source (for example, the operator of the wireless network 50 and/or the wireless gateway 62) to decrypt the data.

In various embodiments, other predetermined trigger conditions are trigger events in step 204. For example, in one embodiment, variation in user input from a predetermined threshold, such as lack of keyboard activity for a predetermined duration, is used to trigger the requirement for user action, failing which information protection measures are taken. In some embodiments, trigger conditions can be based on changes in communications, messaging or usage characteristics or patterns of the device 10. For example a trigger condition could result when volume of data packets sent or received by the device over the wireless network traffic exceeded a predetermined threshold, or when the pattern of base stations used in communications varied from predetermined thresholds. A trigger condition could result if the device went outside of a predetermined coverage area. In some embodiments, the thresholds for determining trigger conditions could be adaptively configured by the security module based on normal operating characteristics of the device 10.

The above-described embodiments of the present invention are intended to be examples only. Alterations, modifications and variations may be effected to the particular embodiments by those skilled in the art without departing from the scope of the invention, which is defined by the claims appended hereto.

What is claimed is:

1. A mobile communications device for communicating with a wireless network, comprising:
   an electronic storage having data stored thereon;
   a processor coupled to the storage for accessing the data;
   a communications sub-system coupled to the processor for exchanging signals with the wireless network and with the processor;

a user input interface configured to send user input signals to the processor in response to user action; and a security module that configures the processor to:
monitor for an expiration of a duration of time during which the device has been out of communication with the wireless network; and
upon expiration of the duration of time,
when a successful user authentication at the device does not occur within a fuse time following the expiration of the duration of time during which the device has been out of communication with the wireless network, perform a security action in which all or part of the data from the storage is at least one of erased and encrypted, and
when the successful user authentication occurs at the device within the fuse time following the expiration of the duration of time during which the device has been out of communication with the wireless network, continue processing without performing the security action in which all or part of the data from the storage is at least one of erased and encrypted.

2. The mobile communications device of claim 1, wherein the data comprises service data usable by the device to successfully communicate over the wireless network.

3. The mobile communications device of claim 1, wherein the security action comprises disabling an ability of the device to communicate with the wireless network.

4. The mobile communications device of claim 1, wherein the user authentication comprises receipt of a password or shared secret via the user input interface.

5. The mobile communications device of claim 1, wherein the device comprises a user output device for issuing a prompt for the user authentication in response to the expiration of the duration of time during which the device has been out of communication with the wireless network.

6. The mobile communications device of claim 1, wherein the device does not issue a prompt for the user authentication in response to the expiration of the duration of time during which the device has been out of communication with the wireless network.

7. The mobile communications device of claim 1, wherein the device refuses attempted user actions other than the user authentication during the fuse time.

8. The mobile communications device of claim 1, wherein the data comprises at least one of: one or more e-mail messages, one or more contact lists, one or more address book lists, calendar information, scheduling information, one or more notepad documents, one or more image files, one or more text files, or user information.

9. A method of providing security for a mobile communication device configured to communicate over a wireless network, the method comprising:
monitoring for an expiration of a duration of time during which the device has been out of communication with the wireless network; and
upon expiration of the duration of time,
when a successful user authentication does not occur within a fuse of time following the expiration of the duration of time during which the device has been out of communication with the wireless network, performing a security action in which all or part of the data stored on an electronic storage is at least one of erased and encrypted, and
when the successful user authentication occurs within the fuse time following the expiration of the duration of time during which the device has been out of communication with the wireless network, continue processing without performing the security action in which all or part of the data from the storage is at least one of erased and encrypted.

10. The method of claim 9, wherein the data comprises service data usable by the device to successfully communicate over the wireless network.

11. The method of claim 9, wherein the security action comprises disabling an ability of the device to communicate with the wireless network.

12. The method of claim 9, wherein the user authentication comprises receipt of a password or shared secret via the user input interface.

13. The method of claim 9, further comprising issuing a prompt for the user authentication in response to the expiration of the duration of time during which the device has been out of communication with the wireless network.

14. The method of claim 9, wherein the device does not issue a prompt for the user authentication in response to the expiration of the duration of time during which the device has been out of communication with the wireless network.

15. The method of claim 9, further comprising refusing attempted user actions other than the user authentication during the fuse time.

16. The method of claim 9, wherein the data comprises at least one of; one or more e-mail messages, one or more contact lists, one or more address book lists, calendar information, scheduling information, one or more notepad documents, one or more image files, one or more text files, or user information.

17. A non-transitory computer-readable medium comprising instructions for providing security for a mobile communication device configured to communicate over a wireless network, wherein the instructions, when executed by a processor of the device, configure the processor to;
monitor for expiration of a duration of time during which the device has been out of communication with the wireless network; and
upon expiration of the first duration of time,
when a successful user authentication does not occur within a fuse time following the expiration of the duration of time during which the device has been out of communication with the wireless network, perform a security action in which all or part of the data stored on an electronic storage is at least one of erased and encrypted, and
when the successful user authentication occurs within the fuse time following the expiration of the duration of time during which the device has been out of communication with the wireless network, continue processing without performing the security action in which all or part of the data from the storage is at least one of erased and encrypted.

* * * * *